United States Patent [19]

Thuries

[11] Patent Number: 5,742,001
[45] Date of Patent: Apr. 21, 1998

[54] BURIED ELECTRICAL TRANSMISSION LINE EQUIPPED WITH A COOLING DEVICE

[75] Inventor: Edmond Thuries, Meyzieu, France

[73] Assignee: GEC Alsthom T & D SA, Paris, France

[21] Appl. No.: 744,525

[22] Filed: Nov. 6, 1996

[30] Foreign Application Priority Data

Nov. 7, 1995 [FR] France ................................ 95 13155

[51] Int. Cl.⁶ .................................................. H01B 7/34
[52] U.S. Cl. ......................... 174/15.6; 174/28; 174/37; 165/181; 165/182; 165/183; 165/45
[58] Field of Search ......................... 174/28, 27, 29, 174/25 G, 26 G, 15.1, 15.2, 15.6, 37, 38; 165/181, 182, 183, 45

[56] References Cited

U.S. PATENT DOCUMENTS

| | | | |
|---|---|---|---|
| 473,176 | 4/1892 | Holden | 165/183 |
| 1,993,065 | 3/1935 | Light | 165/183 X |
| 2,261,137 | 11/1941 | Brown, Jr. | 165/183 |
| 3,621,108 | 11/1971 | Cleaveland | 174/15 |
| 3,761,599 | 9/1973 | Beatty | 174/15 R |
| 3,847,213 | 11/1974 | Stich | 165/181 |
| 4,009,417 | 2/1977 | Waldon et al. | 174/15.1 X |
| 4,009,418 | 2/1977 | Bennett | 174/15.2 X |
| 4,097,682 | 6/1978 | Perry et al. | 174/37 X |
| 4,491,175 | 1/1985 | Bloem | 165/183 |
| 5,496,965 | 3/1996 | Thuries et al. | 174/28 X |
| 5,530,200 | 6/1996 | Thuries et al. | 174/26 G X |

FOREIGN PATENT DOCUMENTS

| | | |
|---|---|---|
| B7710187 | 6/1990 | Australia . |
| 2251116 | 6/1975 | France . |
| 2707205A1 | 8/1978 | Germany . |

*Primary Examiner*—Kristine L. Kincaid
*Assistant Examiner*—Dean A. Reichard
*Attorney, Agent, or Firm*—Sughrue, Mion, Zinn, Macpeak & Seas, PLLC

[57] ABSTRACT

A buried armored power transmission line includes a metal jacket housing at least one conductive busbar. The line is equipped with a cooling device operating by transferring heat from the jacket to the surface of the soil, including a metallic structure fixed to the jacket and extending towards the surface of the soil. This structure has a plurality of vertical first plates connected to the jacket having a vertical dimension such that their top edge is at a permissible calculated depth.

8 Claims, 3 Drawing Sheets

BURIED ELECTRICAL TRANSMISSION LINE EQUIPPED WITH A COOLING DEVICE

BACKGROUND OF THE INVENTION

1. Field of the Invention

The present invention concerns a cooling device for buried electrical transmission lines.

To be more precise, it concerns an armored buried power transmission line including within a metallic jacket at least one conductive busbar, this line being equipped with a cooling device operating by transferring heat from said jacket to the surface of the soil and comprising a metallic structure fixed to said jacket and extending towards the surface of the soil.

2. Description of the Prior Art

A pressurized gas insulated high-tension armored electrical transmission line of this kind comprising a plurality of sections assembled together and including at least one conductive busbar held in place within a cylindrical jacket is described in French patent application 92/06733 filed 3 Jun. 1992.

An armored line of this kind is designed to be buried at a certain depth, a depth in the order of one meter, for example, to operate optimally without over heating. Given the irregularity of the average terrain, it is inevitable that at least some sections of the line will be at a greater depth than this optimal depth. Harmful heating can occur in these sections unless special equipment is provided to prevent it.

The document FR-2 251 116 describes the association with the jacket of heat exchangers including tubular metallic pipes that evacuate the heat resulting from losses in a thermally conductive fluid. Such exchangers are particularly costly to manufacture.

SUMMARY OF THE INVENTION

To solve this problem, in accordance with the invention, a buried armored power transmission line comprises in a metal jacket at least one conductive busbar, said line is equipped with a cooling device operating by transferring heat from said jacket to the surface of the soil, the cooling device comprising a metallic structure fixed to said jacket and extending towards said surface of said soil, and said metallic structure comprising a plurality of vertical first plates connected to said jacket and having a vertical dimension such that their top edge is at a permissible calculated depth.

In a first embodiment said first plates are connected radially to said jacket and are perpendicular to a longitudinal axis of said jacket.

In a second embodiment said first plates are connected to said jacket and are parallel to said longitudinal axis of said jacket.

Said first plates are preferably each nested in a slot in a second plate adapted to be disposed horizontally at substantially said permissible depth.

Said first plates are advantageously each nested in a slot in a second plate adapted to be disposed horizontally at substantially said permissible depth.

The invention is described in more detail hereinafter with the aid of drawings showing one preferred embodiment of the invention.

DETAILED DESCRIPTION OF THE PREFERRED EMBODIMENTS

Figure 1:
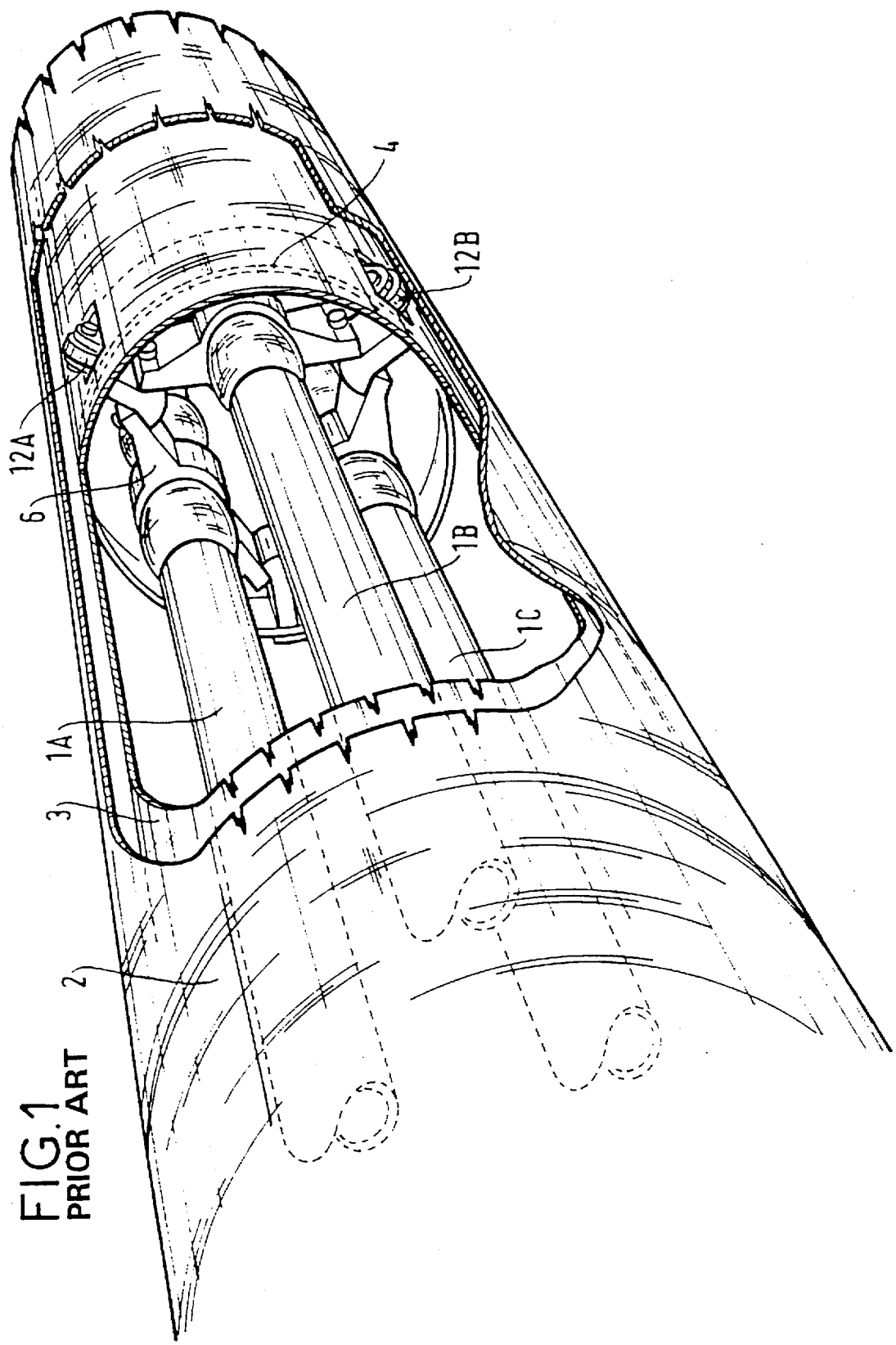
FIG. 1 is a partly cut away perspective view of a prior art electrical transmission line to which the invention applies.

FIG. 1 shows three conductive, for example aluminum, tubular busbars 1A, 1B and 1C having a cross-section to suit the current they carry. In this embodiment the line is a three-phase line but it could equally well be a single-phase line.

The busbars are disposed inside a tubular steel jacket 2 filled with an insulative gas, preferably nitrogen, at a pressure of 8 hectopascals to 15 hectopascals. The steel tube is sealed from the surrounding environment.

The resultant of the magnetic field due to the flow of a balanced three-phase current in the conductors is virtually zero at a distance of several meters, so that the electrical line does not represent a danger to persons living nearby, even if the line is merely laid in a trench.

However, at the short distance between the conductors and the steel tube, the magnetic field is high and to prevent Eddy current losses in the steel tube a thin tubular aluminum jacket 3 is disposed coaxially with the steel tube, around the conductive busbars.

Collars 4 are disposed along the aluminum tube, preferably made from an a magnetic metal, and having three arms at 120° to each other, directed axially towards the axis of the line and carrying insulative supports 6 holding the conductive busbars 1 in place.

The collar 4 has, preferably in line with the arms, pairs of molded flanges accommodating rollers 12A, 12B enabling the tube 3 to be rolled along the inside wall of the steel tube 2.

The aluminum jacket reduces the losses in the steel tube.

Figure 2:
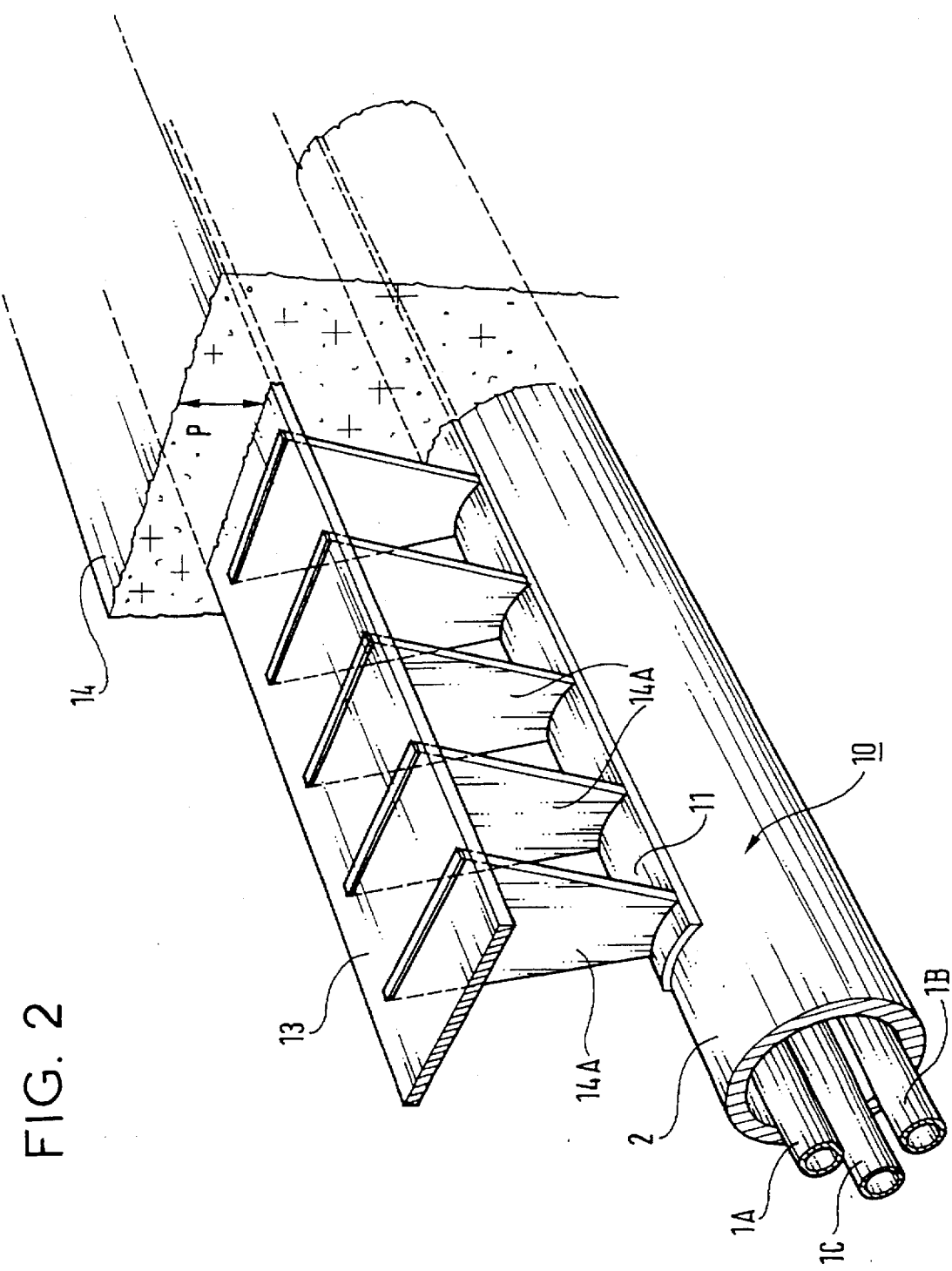
FIG. 2 is a partial perspective view of a line section equipped with a first embodiment of a cooling device of the invention.

FIG. 2 shows a line 10 of this kind equipped with a first embodiment of a cooling device operating by transferring heat from the outer jacket 2 of the line to the surface 14 of the soil.

Along the upper generatrix of the jacket 2 there is fixed a metallic structure comprising a plurality of first plates 14A forming trapezoidal fins with their width increasing towards the surface 14 of the soil, connected radially to the jacket 2 and perpendicular to the longitudinal axis of the jacket 2. Their length is such that their upper edge is at a permissible calculated depth P.

At this depth P is a horizontal second plate 13 having slots at the same pitch as the fins 14A, in which the latter are nested.

The fins 14A and the plates 13 are preferably made of aluminum or steel.

The fins 14A are advantageously welded to a saddle-shaped supporting third plate 11 fixed along the top generatrix of the jacket 2. The plate 11 is preferably made of oxidized and/or varnished steel bonded to the steel jacket 2.

The pitch of the fins 14A is determined to suit the technical specifications of the armored line and may be equal to or greater than 10 cm, for example, each fin 14A being approximately 10 mm thick. The length of the third plate 11 may be in the order of 2 m, a plurality of plates 11 equipped with fins 14A being placed end-to-end on the line section to be provided with the cooling device.

The line equipped in this way is installed on site in the following manner.

The line section is laid in the bottom of a trench in the known manner. The support plate 11 and the welded fins 14A are fixed to the line section. Screened recovered soil is tipped onto the line and compacted to a level slightly above the upper edges of the fins 14A. A thin layer of this soil is then removed to expose the upper edge of the fins 14A and the slotted plate 13 is fitted. The trench is then backfilled level with the surface 14 of the soil.

Figure 3:
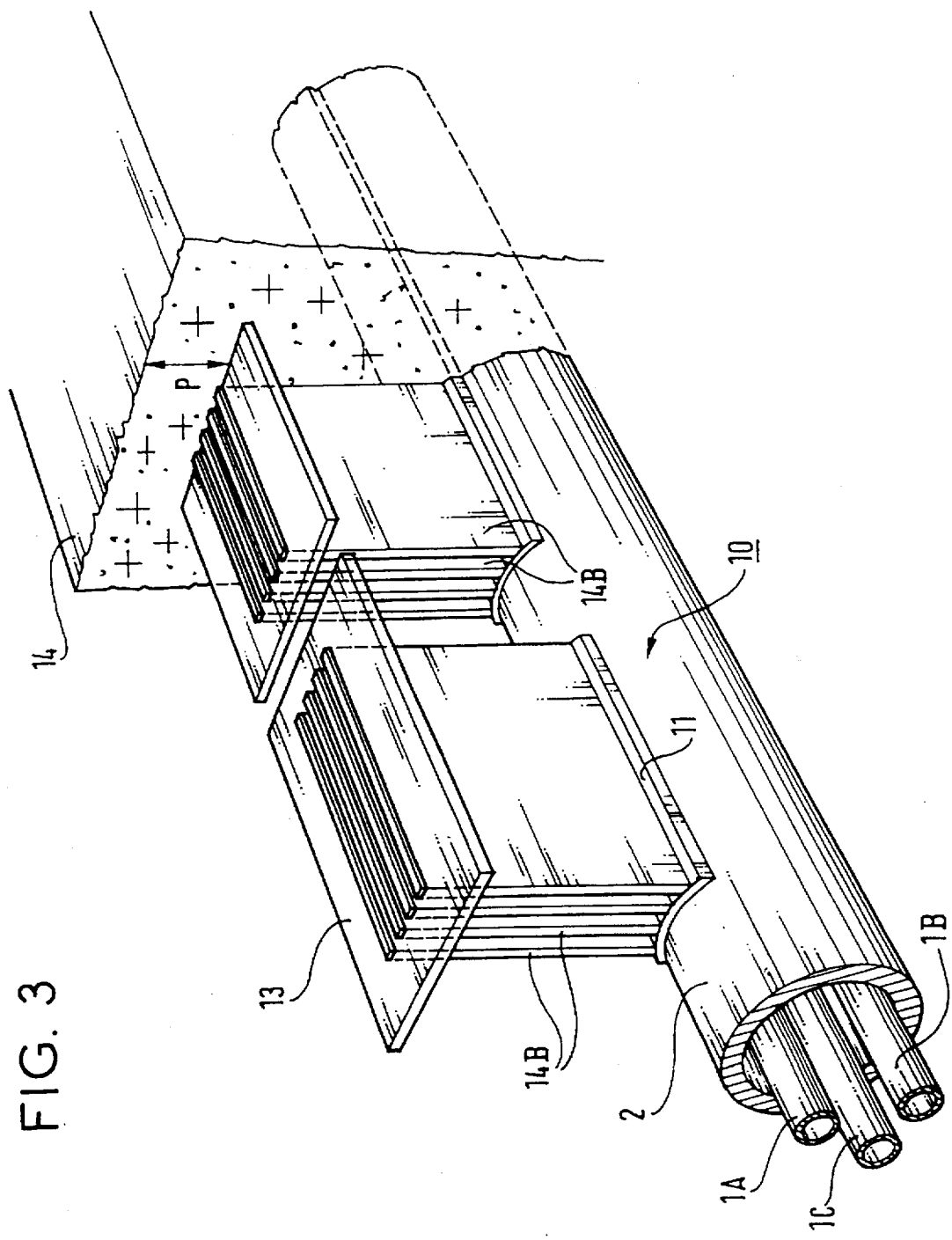
FIG. 3 is a partial perspective view of a line section equipped with a second embodiment of a cooling device of the invention.

FIG. 3 shows a line 10 of this kind equipped with a second embodiment of the cooling device which operates by transferring heat from the outer jacket 2 of the line to the surface 14 of the soil.

Along the top generatrix of the jacket 2 there is fixed a metallic structure comprising a plurality of first plates 14B made up of rectangular shaped fins, connected to the jacket 2 and parallel to the longitudinal axis of the jacket 2. Their width is such that their upper edge is at a permissible calculated depth P.

At this depth P is laid a horizontal second plate 13 having slots at the same pitch as the fins 14B, in which the latter are nested.

The fins 14B and the plate 13 are preferably made of aluminum.

The fins 14B are advantageously welded to a saddle-shaped supporting third plate 11 fixed along the top generatrix of the jacket 2. The plate 11 is preferably made from oxidized and/or varnished steel bonded to the steel jacket 2.

The pitch of the fins 14B is determined to suit the technical specifications of the armored line and may be equal to or greater than 10 cm, for example. Each fin 14A is approximately 10 mm thick. The length of the third plate 11 may be in the order of 2 m, a plurality of plates 11 equipped with fins 14B being placed end-to-end on the line section to be provided with the cooling device.

The line equipped in this way is installed on site in the following manner.

The line section is laid in the bottom of a trench in the known manner. The support plate 11 and the welded fins 14B are fixed to the line section. Screened recovered soil is tipped onto the line and compacted to a level slightly below the top edges of the fins 14B using a roller with projecting ribs that fit between the fins 14B. The slotted plate 13 is installed. The trench is finally backfilled level with the surface 14 of the soil.

There is claimed:

1. An armored power transmission line adapted to be buried in soil, comprising a metal jacket housing at least one conductive busbar, and a cooling device for transferring heat from said jacket to a surface of the soil, said cooling device comprising a metallic structure fixed to said jacket and extending towards said surface of said soil, said metallic structure comprising a plurality of vertical first plates connected to said jacket and each having a vertical dimension such that a top edge thereof is at a permissible calculated depth below said surface of said soil to allow said transmission line to operate without overheating.

2. The line claimed in claim 1 wherein said first plates are connected radially to said jacket and perpendicular to a longitudinal axis of said jacket.

3. The line claimed in claim 1 wherein said first plates are connected to said jacket and parallel to a longitudinal axis of said jacket.

4. The line claimed in claim 2 wherein said metallic structure further comprises a second plate having a plurality of slots corresponding to said plurality of first plates, and wherein each of said first plates is nested in one of said plurality of slots such that said second plate is disposed horizontally at substantially said permissible depth.

5. The line claimed in claim 3, wherein said metallic structure further comprises a second plate having a plurality of slots corresponding to said plurality of first plates, and wherein each of said first plates is nested in one of said plurality of slots such that said second plate is disposed horizontally at substantially said permissible depth.

6. The line claimed in claim wherein said metallic structure further comprises a supporting third plate welded to said first plates and fixed along a top generatrix of said jacket.

7. The line claimed in claim 1 wherein said first plates are made of aluminum.

8. The line claimed in claim 1 wherein said first plates are made of steel.

* * * * *